No. 796,337. PATENTED AUG. 1, 1905.
P. LIBERTY.
NUT LOCK.
APPLICATION FILED MAR. 20, 1905.
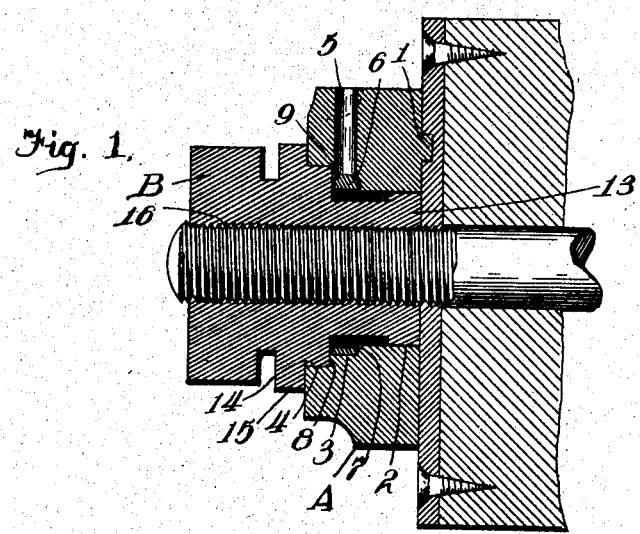
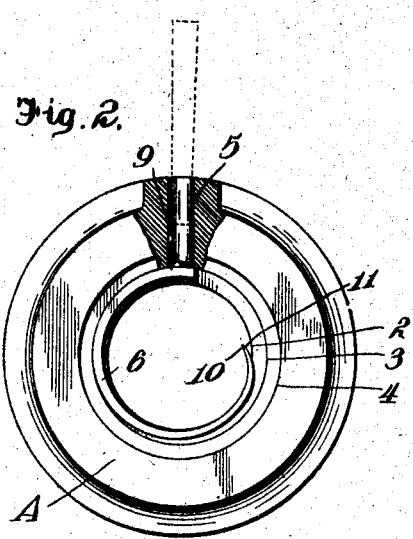
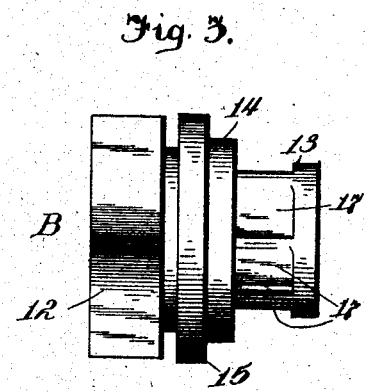
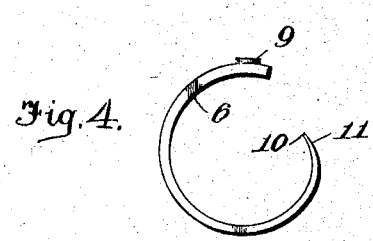
Witnesses
Inventor
Peter Liberty
by Addison G. DuBois
his Attorney.

UNITED STATES PATENT OFFICE.

PETER LIBERTY, OF WARREN, PENNSYLVANIA.

NUT-LOCK.

No. 96,337.        Specification of Letters Patent.        Patented Aug. 1, 1905.

Application filed March 20, 1905. Serial No. 251,110.

*To all whom it may concern:*

Be it known that I, PETER LIBERTY, a citizen of the United States, and a resident of Warren, in the county of Warren and State of Pennsylvania, have invented a new and useful Improvement in Nut-Locks, set forth in the annexed specification.

My invention relates to an improvement in nut-locks, the object being to provide a simple method of effectually locking a nut to its bolt, so that it will not work loose accidentally, and can only be removed by first inserting a key and disengaging or dislocating the detachably-supported spring-pawl from its seat.

With the foregoing object in view my invention consists in a washer adapted to be secured against rotation and having a detachably-seated spring-pawl carried thereby, in connection with a peculiarly-constructed nut adapted to screw on the bolt and provided with ratchet-teeth which are engaged by the spring-pawl, whereby the nut is locked to the washer against the possibility of being turned in a reverse direction without first unseating or dislocating the spring-pawl.

It further consists in certain novel features of construction and combinations of parts, which will be hereinafter described, and pointed out in the claims.

In the accompanying drawings, Figure 1 is a vertical section. Fig. 2 is a view looking into the washer with the nut removed. Fig. 3 is a view of the nut, and Fig. 4 is a detached view of the spring-pawl.

A represents a washer having a lug or pin 1 on its inner face adapted to enter a hole in the fish or other plate, whereby to prevent it from turning. In the center of the washer a bore is formed upon three separate and distinct diameters 2, 3, and 4, commencing from the smaller diameter, and a radial orifice 5 extends through the washer from the intermediate bore to the outer surface, it being adapted to receive a key to operate the spiral-spring dog 6, which latter approximately fits the intermediate bore 3, resting upon the shoulder 7 formed between it and the smaller bore 2, with its outer surface extending flush with the shoulder 8, formed between the intermediate and the outer bore 4. This spring-pawl has a lug 9 on one end which extends into and approximately fits the inner end of the orifice 5, while the opposite end 10 constitutes the operative part of the pawl, it being bent inward a trifle for that purpose and beveled on the outer edge, as at 11, for a purpose which will presently be explained.

A nut B has the angular outer end 12 to receive a wrench by which to turn it and is provided with a shank 13, which fits the inner bore 2 of the washer and is adapted to turn therein, and at an intermediate point the nut is provided with the reduced cylindrical portion 14, which fits the outer bore 4, while a flange 15 rests and turns upon the outer surface of the washer. The bore of the nut is screw-threaded in the usual manner, as at 16, throughout the length thereof, and the length of the shank and reduced portion from the flange to the end of the shank is just equal to the thickness of the washer, so that when the nut is in place and screwed home, with the flange 15 resting upon the outer surface of the washer, the inner end of the shank is flush with the inner surface of the washer, and between the shank and the intermediate bore a chamber intervenes and is occupied by the spiral-spring pawl. The shank is provided with the ratchet-teeth 17 17, which the free end of the pawl enters for the purpose of locking the nut against reverse motion, while its resiliency admits of the nut being turned forward until it is screwed down as far as it will go, when the pawl securely locks it against accidental or other reverse movement. The purpose of the beveled edge 11 is now apparent. In assembling the parts and inserting the shank of the nut in the bore of the washer the end 10 of the pawl lies partially in its path. By striking this beveled portion the latter is sprung out of the way to permit the shank to pass, and as soon as the toothed portion of the shank comes opposite this pawl the latter springs into the toothed portion adjacent. To unlock the pawl, it is simply necessary to insert a key or pin in the orifice and force the lug 9 out of said orifice 5, whereupon the nut may be turned to the left to remove it from the bolt. Thus it will be seen that accidental unlocking of the nut or displacement of the pawl due to jar or from other cause is impossible and that the nut can only be unlocked in the manner explained.

It is evident that slight changes might be resorted to in the form and arrangement of the several parts described without departing from the spirit and scope of my invention, and hence I do not wish to limit myself to the exact construction herein set forth; but, Having fully described my invention, what

I claim as new, and desire to secure by Letters Patent, is—

1. In a nut-lock, the combination with a washer, and means for preventing it from turning, said washer having its bore formed on different diameters, and an orifice extending from the intermediate bore, of a spiral-spring pawl seated in the intermediate bore, and having a lug at one end which enters the inner end of the orifice, and the opposite end bent inward to constitute a pawl, of a nut having a shank which is fitted to turn in the smaller bore of the washer, and is provided with ratchet-teeth with which the end of the pawl engages, whereby to lock the nut to the washer, against turning in a reverse direction.

2. In a nut-lock, the combination with a washer, the bore of which is formed on several diameters, and provided with a radial orifice extending from the intermediate diameter to the surface of the washer, and means for preventing the washer from turning, of a nut having a threaded bore and a ratchet-toothed shank with a reduced portion, the shank fitted to turn in the smaller diameter of the bore of the washer and the reduced portion in the largest bore of the washer, and a chamber being formed between the toothed portion of the shank and the wall of the intermediate bore of the washer, and a spring-pawl seated in this chamber, and provided at one end with a lug adapted to enter the inner end of the orifice, while the opposite end engages the teeth of the nut and locks the latter against turning in the reverse direction.

In testimony whereof I have signed this specification in the presence of two subscribing witnesses.

PETER LIBERTY.

Witnesses:
CURTIS M. SHAWKEY,
HOWARD J. SHAWKEY.